Jan. 29, 1935.  M. W. McCONKEY  1,989,208
BRAKE
Original Filed Feb. 11, 1929

INVENTOR.
MONTGOMERY W. McCONKEY
BY
ATTORNEY

Patented Jan. 29, 1935

1,989,208

UNITED STATES PATENT OFFICE 1,989,208

BRAKE

Montgomery W. McConkey, South Bend, Ind., assignor to Bendix Brake Company, South Bend, Ind., a corporation of Illinois Original application February 11, 1929, Serial No. 339,000. Divided and this application March 7, 1931, Serial No. 520,802

REISSUED

38 Claims. (Cl. 188—79.5)

This invention relates to brakes and more particularly to internal expanding brakes.

The present invention is a division of my pending application Serial No. 339,000 filed February 11, 1929, and is made under the requirements of the United States Patent Office under provision of Rule 42.

Broadly, the invention comprehends means for adjusting the friction elements of an internal expanding brake to compensate for wear on the linings thereof and to position the friction elements in proper relation to the braking surface of the drum when the brake is in the off position.

An object of the invention is to provide an expansible connection for the articulated ends of friction elements.

A salient feature of the invention is a ball and socket connection between the articulated ends of the friction elements of an internal expanding brake and means associated therewith for changing the relative positions of the friction elements.

An important feature of the invention is an adjusting member comprising two parts threaded together and provided with oppositely arranged sockets adaptable for the reception of the articulated ends of friction elements.

Yet another feature of the invention is an adjusting device including two members threaded together and provided with oppositely disposed sockets, at least one of which has an annular groove.

Still a further feature of the invention is to provide a device comprising two parts threaded together, the parts having oppositely disposed conical faces, and recesses opening in opposite directions.

The above and other objects and features of the invention including various details of structure will be apparent from the following description of the illustrated embodiments shown in the accompanying drawing, which forms a part of this specification, and in which.

Figure 1:
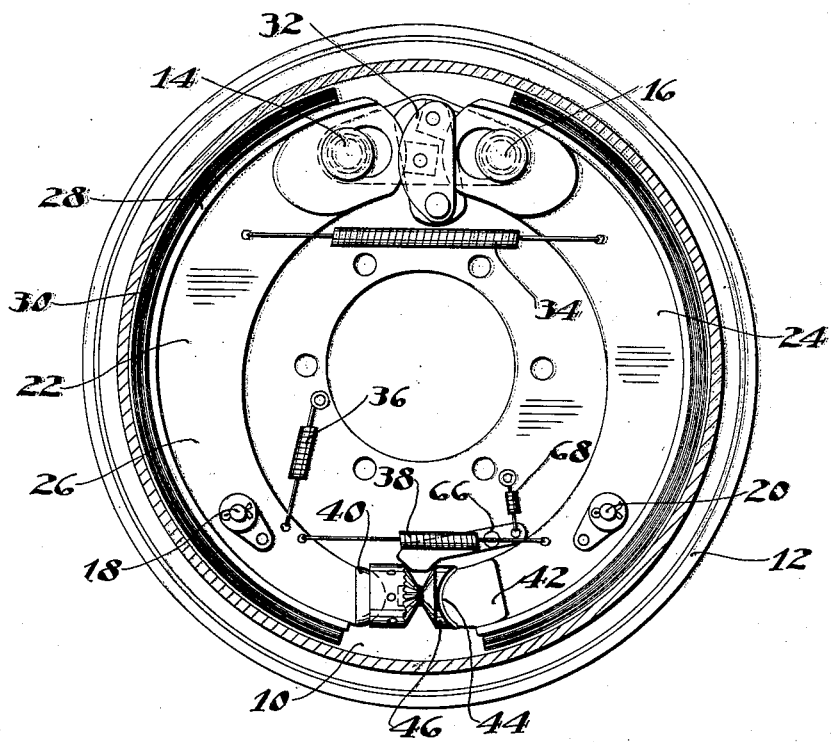
Figure 1 is a vertical sectional view taken just back of the head of the drum illustrating the friction elements in side elevation and showing the invention as applied.
Figure 2:
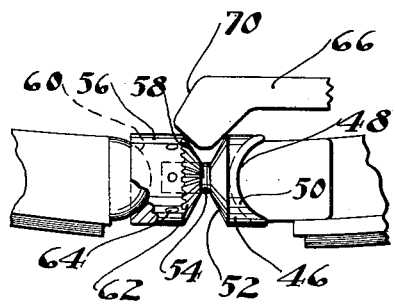
Figure 2 is an enlarged detail view.

Referring to the drawing for more specific details of the invention, 10 represents a fixed support such as a backing plate having associated therewith a rotatable drum 12 which may be secured to a wheel, not shown. Positioned on the backing plate are suitable anchors 14 and 16 and steady rests 18 and 20, and positioned for movement on the steady rests are friction elements or shoes 22 and 24.

As shown, each of the shoes comprises a web 26 supporting a rim 28 to which is suitably secured a lining 30 adaptable for co-operation with the drum. The articulated ends of the friction elements or shoes 22 and 24 are connected by an adjusting device, to be hereinafter described, and the separable ends are provided with transverse openings for the reception of the anchors 14 and 16.

Positioned on the backing plate between the separable ends of the friction elements or shoes 22 and 24 is a floating operating cam 32 for spreading the shoes into engagement with the drum against the resistance of a return spring 34 connected between the shoes and a return spring 36 connecting the shoe 22 to a fixed support on the backing plate. These springs serve, upon release of the applied force, to return the friction elements or shoes to the off position and to retain them when in the off position in proper spaced relation to the braking surface of the drum.

The friction elements or shoes are connected adjacent their articulated ends by a spring 38 which retains the articulated ends in engagement with the adjusting device. As shown, the friction element 22 is provided upon its articulated end with a ball or hemispherical member 40, and the articulated end of the friction element 24 has thereon an extending portion 42 provided with a semi-circular end 44.

Positioned between the hemispherical member 40 and the semi-circular end 44 on the extension 42 is the adjusting device including a member 46 having an arcuate bearing surface 48 provided with a circumferential slot 50 for the reception of the semi-circular end 44 on the extension 42 of the friction element 24. The opposite end of this member is provided with a conical shoulder 52, and extending axially from the shoulder is a threaded member 54, on which is positioned for travel a cylindrical member 56 provided with a conical shoulder 58 arranged in oppositely disposed relation to the conical shoulder 52 on the member 46.

The member 56 is provided with a recess 60 adaptable for the reception of the articulated end of the friction element 22. Preferably the recess 60 is hemispherical so that the hemispherical member 40 on the friction element 22 will fit smoothly therein. As shown, the shoulder 58 on the member 56 is provided with serrations 62, and arranged in spaced relation on the member 58 are recesses 64 for the reception of an adjusting wrench.

Pivoted on the backing plate 10 is a centering lever 66 urged into position by a spring 68. This lever has a wedge shaped end 70 engaging the conical shoulders 52 and 58. As shown, one edge of the wedge shaped end on the centering lever engages the serrations 62 on the member 56, so that the member 56 may be retained in adjusted position.

Figure 3:
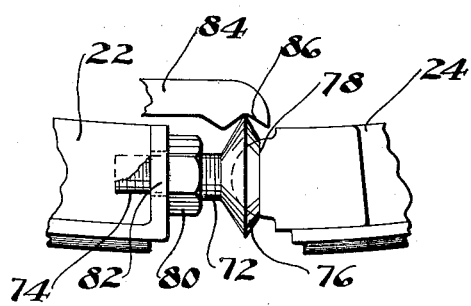
Figure 3 is a modification of the invention.

A modification of the invention is illustrated in Figure 3, wherein the friction elements 22 and 24 have positioned between their articulated ends an adjusting device including a threaded member 72 provided with a diametral slot 74 for the reception of the web on the friction element 22 and a head 76 having a socket 78 adaptable for the reception of the articulated end of the friction element 24.

Positioned for travel on the threaded member 72 is a nut 80 adapted to bear against a suitable abutment 82 on the articulated end of the shoe, or against the web of the shoe as may be desired. By turning the nut the shoes may be adjusted with respect to each other.

The head 76 on the member 72 has a reversely bevelled edge adapted to engage a centering lever 84. The lever has a notch 86 which receives the bevelled edge on the head, the notch being of such proportion that free movement of the friction elements, together with the connecting device, may be had. When the friction elements are released, the centering lever co-operates with the bevelled edge on the head to centering friction elements.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake adjusting device comprising a member having a recessed head for movable thrust engagement with another part and having a threaded stem formed with a longitudinal slot adapted to receive a shoe web, and a member positioned for travel on the stem in thrust engagement with the end of said web.

2. A brake adjusting device comprising, in association with a brake shoe, a member having a threaded stem and a thrust surface on its end, and a nut having a spherical socket receiving the end of the shoe and positioned for travel on the stem and arranged in thrust engagement with said shoe.

3. An adjusting device comprising a member having a threaded stem at one end and a cylindrical thrust surface at its other end, and a member threaded on said stem for travel thereon having a spherical thrust surface at the end of the adjusting device opposite said cylindrical surface.

4. An adjusting device comprising a member having an arcuate bearing surface, a threaded stem on the member having its axis coinciding with a radius of the bearing, a recessed member positioned for travel on the stem and a brake shoe pivotally engaged by the recessed member.

5. An adjusting device comprising a member having a cylindrical bearing surface provided with a circumferential slot, a threaded stem on the member having its axis in a plane with a radius of the bearing and a member positioned for travel on the stem, in combination with a part having a web formed with a semi-circular end seated in said slot.

6. An adjusting device comprising a member having an arcuate bearing surface provided with a circumferential slot, a threaded stem on the member having its axis in a plane with a radius of the bearing and a nut positioned for travel on the stem having a recess oppositely disposed to the bearing.

7. An adjusting device comprising a member having an arcuate bearing provided with a circumferential slot, a conical shoulder on the member, a threaded stem on the shoulder, a recessed nut positioned for travel on the threaded stem, a bevelled shoulder on the nut oppositely disposed with relation to the shoulder on the member said conical shoulder and bevelled shoulder adapted to engage a centering member and means for applying an adjusting wrench to the nut.

8. An adjusting device comprising a member having a bearing surface, a conical shoulder opposite the bearing surface, a threaded member on the conical shoulder, a recessed nut positioned for travel on the threaded member, a conical shoulder on the nut arranged in oppositely disposed relation to the conical shoulder on the member said conical shoulder adapted to engage a centering member and means on the nut for applying a wrench.

9. An adjusting device comprising a threaded member, a head on the threaded member having a conical portion and recess said conical portion adapted to engage a centering means and a nut positioned for travel on the threaded member.

10. A brake adjusting device comprising, in association with a brake shoe, a threaded member, a head on the member having a hemispherical recess adapted to engage said brake shoe and a nut positioned for travel on the member.

11. An adjusting device comprising a threaded member having a diametral slot, a head on the member having a recess, a reversely bevelled edge on the head adapted for co-operation with a centering lever and a nut positioned for travel on the member.

12. An adjusting device comprising a threaded member having a diametral slot, a head on the member having a hemispherical recess, a reversely bevelled edge on the head, a nut positioned for travel on the threaded member and a centering lever having a notch adapted to co-operate with the edge of the nut.

13. A brake comprising friction elements arranged end to end and means adjustably connecting adjacent ends of the friction elements including two members threaded together, at least one of which is slotted to embrace one of the elements.

14. A brake comprising friction elements arranged end to end, an adjusting member positioned between adjacent ends including two members threaded together, one of said members having a notch for the reception of one of the friction elements and the other a hemispherical recess for the reception of the other friction element.

15. A brake comprising at least two friction elements arranged end to end, an adjusting device between the adjacent ends of the friction elements including two members threaded together and provided with means for the reception of the ends of the friction elements and oppositely disposed conical shoulders on the members adaptable for co-operation with a centering lever.

16. A brake comprising at least two friction elements arranged end to end, a hemispherical end on one of the friction elements, a rounded end on the other friction element, an adjusting device between the hemispherical end and the rounded end including a member having an arcuate bearing provided with a circumferential slot for the reception of the rounded end, a threaded shank on the member and a nut positioned for travel on the threaded shank having a hemispherical recess for the reception of the hemispherical end.

17. A unitary brake adjusting member having a head at one end adapted for disconnected thrust engagement with an adjacent element, and spaced portions at its other end adapted to straddle the web of a brake shoe and threaded means adjustably acting on said portions.

18. A unitary brake adjusting member having a head at one end adapted for disconnected thrust engagement with an adjacent element, and spaced portions at its other end adapted to straddle the web of a brake shoe.

19. A unitary brake adjusting element having one end bifurcated to straddle the web of a brake shoe and having a curved thrust surface at its other end.

20. A unitary brake adjusting element having one end bifurcated to straddle the web of a brake shoe and having a thrust socket at its other end.

21. A brake shoe having at one end a bifurcated thrust member straddling the web of the shoe and having its other end extending beyond the end of the shoe and formed with a socket for disconnecting thrust engagement with an adjacent element.

22. A brake shoe having a web, a thrust member slidably engaging both sides of said web and having a head beyond the end of the shoe formed for disconnected thrust engagement with an adjacent brake element, and threaded means engaging the web and said member and operable to adjust said member along the web.

23. A brake shoe having a web, and a thrust member having a stem slidably engaging both sides of said web and having a thrust head beyond the end of the shoe, in combination with a brake part pivotally engaged by said heads.

24. A brake shoe having a web and having at its end a transverse flange with an opening opposite the end of the web, and an adjusting member passing through the opening and having a slotted stem straddling said web.

25. A brake shoe having a web and having at its end a transverse flange with an opening opposite the end of the web, an adjusting member passing through the opening and having a slotted stem straddling said web, and an adjusting member adjustably mounted on said stem and engaging said flange.

26. A brake shoe having a web and a slotted adjusting member straddling said web and provided with means adjacent the end of said web having an opening slidably encircling and guiding said member.

27. A pair of brake shoes having a floating connecting joint including a slotted thrust member straddling the end of one shoe and movably engaging the end of the other shoe, and an adjusting device movably mounted on the thrust member and engaging said one shoe.

28. A pair of brake shoes having a floating connecting joint movably engaging one shoe and including a slotted thrust member straddling the end of the other shoe, and an adjusting device threadedly engaging the thrust member and engaging said other shoe and operable to separate the shoes.

29. A pair of brake shoes having between them a floating connecting joint comprising threadedly-connected members engaging respectively different shoes and which are relatively adjustable to separate the shoes, said joint forming a rigid unit disconnectedly engaging the ends of the shoes, and means yieldingly holding the shoes against the ends of said joint.

30. A pair of brake shoes having between them a floating connecting joint comprising threadedly-connected members engaging respectively different shoes and which are relatively adjustable to separate the shoes, said joint forming a rigid unit disconnectedly engaging the ends of the shoes, and a spring tensioned between the shoes and holding the shoes against the ends of said joint.

31. A pair of brake shoes having between them a floating connecting joint comprising threadedly-connected members engaging respectively different shoes and which are relatively adjustable to separate the shoes, said joint having at its opposite ends sockets receiving the ends of the shoes.

32. A pair of brake shoes having between them a floating connecting joint comprising threadedly-connected members engaging respectively different shoes and which are relatively adjustable to separate the shoes, said joint having at its opposite ends sockets receiving the ends of the shoes, at least one of said sockets being a slot straddling the end of the web of the corresponding shoe.

33. A pair of brake shoes having between them a floating connecting joint comprising threadedly-connected members engaging respectively different shoes and which are relatively adjustable to separate the shoes, said joint having at its opposite ends recesses movably embracing the ends of the webs of the shoes.

34. A brake comprising a pair of shoes, anchorage and applying means engaging the ends of said shoes at one side of the brake, and a floating rigid connecting joint comprising relatively adjustable parts engaging respectively different shoes and forming a thrust link of adjustable length having movable disconnected thrust engagement with the other ends of said shoes at the other side of the brake.

35. A brake comprising a pair of shoes, anchorage and applying means engaging the ends of said shoes at one side of the brake, a floating rigid connecting joint comprising relatively adjustable parts engaging respectively different shoes and forming a thrust link of adjustable length having movable disconnected thrust engagement with the other ends of said shoes at the other side of the brake, and a spring tensioned between the shoes adjacent their said other ends and holding the shoes and said link in assembled relationship.

36. A brake comprising a pair of shoes, anchorage and applying means engaging the ends of said shoes at one side of the brake, and a floating rigid connecting joint comprising parts threaded together for adjustment along an axis extending chordwise of the brake to form a thrust link of adjustable length having movable disconnected thrust engagement with the other ends of said shoes at the other side of the brake.

37. A brake comprising a pair of shoes, anchorage and applying means engaging the ends of said shoes at one side of the brake, a floating rigid connecting joint comprising parts threaded together for adjustment along an axis extending chordwise of the brake to form a thrust link of of adjustable length having movable disconnected thrust engagement with the other ends of said shoes at the other side of the brake, and a spring tensioned between the shoes adjacent their said other ends and holding the shoes and said link in assembled relationship.

38. A floating brake adjusting device having a head formed with a curved socket therein and with a threaded stem having an adjusting nut threaded thereon, and formed with a hemispherical socket on one face and a conical surface on its other face.

MONTGOMERY W. McCONKEY